3,002,956
POLYMERIZATION PROCESS
Joseph M. Perri, Waynesboro, Va., assignor to E. I. du Pont de Nemours and Company, Wilmington, Del., a corporation of Delaware
No Drawing. Filed May 1, 1958, Ser. No. 732,146
10 Claims. (Cl. 260—79.3)

This invention relates to an improved process for the preparation of copolymers of acrylonitrile. More specifically, it relates to a process for the preparation of copolymers of acrylonitrile with vinylidene chloride.

While polymers of acrylonitrile have been found to be useful for the preparation of shaped articles, particularly for the preparation of fibers for textile uses, the copolymers of acrylonitrile with other vinyl and vinylidene monomers have more frequently been used because the addition of another monomeric component can be used to impart specific desired properties to the end product. Of these copolymers, those of acrylonitrile and vinylidene chloride are particularly desirable when the property of flame resistance is desired.

Unfortunately, the preparation of acrylonitrile/vinylidene chloride copolymers of uniform composition has proven to be a difficult task. Processes in which the polymer separates out in a filterable, easily separated form have not yielded polymers of uniform composition. The prior art, as exemplified by U.S. Patent No. 2,610,173, teaches that it is necessary to polymerize an emulsion system under reflux conditions in order to obtain uniform copolymers of acrylonitrile and vinylidene chloride. This system has the disadvantage that isolation of the polymer from the polymerization mass is difficult and expensive. One method for isolation requires the evaporation of all liquids present with the result that the solid residue of the initiator system and other solid impurities remain in the polymer, thus making it of poor quality for the preparation of textile fibers or filaments. Other means for breaking the emulsion are expensive and time consuming.

It is, therefore, an object of this invention to provide pure, uniform copolymers of acrylonitrile and vinylidene chloride. It is another object of this invention to provide a continuous process for the preparation of acrylonitrile/vinylidene chloride copolymers. A further object of this invention is to provide a process for the preparation of acrylonitrile/vinylidene chloride copolymers which does not require reflux conditions in order to obtain uniform copolymers. A still further object of this invention is to provide a process for preparing uniform copolymers of acrylonitrile and vinylidene chloride in which the isolation of the polymers from the polymerization reactants is effectively and readily accomplished by standard filtration techniques. Other objects wil be apparent from the following discussion.

The foregoing and other objects are accomplished by a process which comprises copolymerizing acrylonitrile and vinylidene chloride in the presence of a small amount of a surface-active agent and an initiator system containing a persulfate catalyst and a sulfoxy reducing agent. The amount of surface-active agent is critical. The amount must be sufficient to stabilize the emulsion of monomers but must not be great enough to stabilize the suspension of solid polymer. This critical range has been found to be from about 0.035% to about 0.080% based on the total weight of the monomers present. The concentration of monomers present may be from about 13% to about 30%, based on the total weight of the reaction mixture.

In practicing this invention it has been found that best results are obtained by continuously metering into a closed reaction vessel equipped with an overflow outlet the necessary monomers, water, initiator, and properly chosen amount of surface-active agent. The vessel is well agitated, and from the overflow an aqueous slurry of polymer is continuously obtained which is of sufficiently coarse particle size to be filterable by standard filtration techniques. The temperature of the vessel is maintained in the range from about 30° C. to about 55° C.

The invention will be further described but is not intended to be limited by the following examples. Proportions are given in parts by weight unless otherwise specified.

*Example I*

To a stirred cylindrical vessel containing an overflow pipe, the following ingredients were continuously added in the proportions indicated:

| | Parts |
|---|---|
| Acrylonitrile | 181 |
| Vinylidene chloride | 59 |
| Potassium persulfate | 2.83 |
| Sodium meta-bisulfite | 4.80 |
| Sodium lauryl sulfate | 0.12 |
| Ferric ion (as ferric chloride) | 0.00009 |
| Water | 752 |

The potassium persulfate, sodium meta-bisulfite, sodium lauryl sulfate, and ferric chloride were separately dissolved in portions of the water for ease in addition to the reactor. The amount of water indicated is the total fed to the reactor. The rate of addition of the reactants and the size of the reactor vessel were such that the reactants would fill the empty vessel to the point of overflow in sixty minutes. The reactor was maintained at a temperature of 32° C. Three hours after the addition of ingredients had been started, the contents of the reactor reached steady state conditions. From the end of the third hour through the end of the eighth hour, at which time the reaction was stopped, the polymer produced was essentially constant in molecular weight and composition. This polymer was filtered from the slurry with a suction filter and was washed with water to remove impurities. It had an intrinsic viscosity of 1.50 as measured in dimethylformamide, and chlorine analysis showed it to contain 23.1% vinylidene chloride units. The conversion of total monomer feed to polymer was 72.5%.

*Example II*

A 29% solution of the polymer of Example I in dimethylformamide was prepared and found to have a viscosity of 120 poises as measured at 125° C. This solution was dry spun into filaments and was extracted to remove solvent, and then drawn to 400% of its original length. The drawn fibers were mechanically crimped, cut to staple lengths, and dried at 125° C. Fabrics prepared from these fibers were found to have a slower burning rate than similar fabrics prepared from fibers of an acrylonitrile/methyl acrylate copolymer.

*Example III*

The procedure of Example I was followed except that the sodium lauryl sulfate was omitted. The slurry in the reactor rapidly increased in consistency to the point that stirring was quite difficult. This high consistency and the agglomeration of polymer in the reactor prevented the operation from being carried to conclusion. Control of the composition of the material during the length of the run was impossible. This experiment showed the necessity of having a small amount of surface-active agent in the reactor for satisfactory polymerization. Additional experiments showed that a minimum of about 0.035% surface-active agent, based on total monomer feed, was necessary for smooth operation.

Example IV

The experiment of Example I was repeated with the single exception that the sodium lauryl sulfate in the feed was raised to 0.43 part. The reaction mass overflowing from the reactor was found to be in the form of an unfilterable suspension. Even after the addition of sodium sulfate to this dispersion, filtration was difficult and time consuming. Additional experiments with varying amounts of surface-active agent showed that a maximum of about 0.080%, based on monomer, was permissible in order that the reaction product was readily filterable without further treatment.

Example V

The experiment of Example I was repeated using each of the following commercial surface-active agents in like amounts in place of the sodium lauryl sulfate of that example:

"Naccanol" NRSF—Trademark of Allied Chemical & Dye Corporation,
"Santomerse" 3—Trademark of Monsanto Chemical Company,
"Duponol" ME—Trademark of E. I. du Pont de Nemours & Company.

The first two of these agents are sodium salts of alkyl aryl sulfonic acids and the third is the sodium salt of an alkyl sulfuric acid. In all cases, the same desirable results found in Example I were obtained. Polymer conversion, polymer molecular weight, and polymer composition were uniform, and the product was easily separated from the reaction medium by filtration.

Example VI

Example I was repeated using 204 parts of acrylonitrile and 36 parts of vinylidene chloride. Uniform filterable polymer of intrinsic viscosity 1.61 and containing 12.0% vinylidene chloride was obtained.

Example VII

The following ingredients were added continuously to a stirred reactor in the proportions indicated:

| | Parts |
|---|---|
| Acrylonitrile | 192 |
| Vinylidene chloride | 48 |
| Sodium styrenesulfonate | 6.25 |
| Potassium persulfate | 2.57 |
| Sodium meta-bisulfite | 4.40 |
| Sodium lauryl sulfate | 0.12 |
| Ferric ion (as ferric chloride) | 0.00014 |
| Sulfuric acid | 0.16 |
| Mercaptoethanol | 0.24 |
| Water | 742 |

The holdup time of the reactants in the reactor vessel was sixty minutes. The slurry overflowing the reactor from the end of the third hour through the end of the eighth hour was of sufficiently low consistency for easy stirring and was readily filterable. The polymer obtained was uniform in composition and molecular weight. Analysis showed it to contain 20.0% polymerized vinylidene chloride and 2.2% polymerized sodium styrenesulfonate.

Example VIII

The following ingredients were added continuously to a reaction vessel which was stirred continuously, in the proportions indicated:

| | Parts |
|---|---|
| Acrylonitrile | 135 |
| Vinylidene chloride | 45 |
| Sodium styrenesulfonate | 2.39 |
| Potassium persulfate | 1.50 |
| Sodium meta-bisulfite | 3.60 |
| Ferric ion (as ferric chloride) p.p.m. | 0.30 |
| "Tween 81"[1] (polyoxyethylene, sorbitan monooleate) | 0.50 |
| Water | 812 |

[1] Trademark of Atlas Powder Company

The potassium persulfate, sodium meta-bisulfite, polyoxyethylene sorbitan monooleate, and ferric chloride were separately dissolved in portions of water for ease in adding them to the reaction vessel. The rate of addition of the reactants and the size of the vessel were such that the reactants filled the empty vessel to the point of overflow in ninety minutes. The pH of the slurry was maintained at 3.2. The vessel was maintained at a temperature of 30° C. Three hours after the addition of the ingredients were started, the reactor reached steady state conditions. From the end of the third hour through the end of the eighth hour, at which time the reaction was stopped, the polymer produced was essentially constant in molecular weight and composition. The polymer was filtered from the slurry with a suction filter and was washed with water to remove impurities. It had an intrinsic viscosity of 1.50 as measured in dimethylformamide. Chlorine analysis showed it to contain 20% vinylidene chloride units. The conversion of total monomer feed to polymer was 77%. At intervals one hour apart samples of the filtrate from the polymerization were collected and shaken vigorously. Complete foam repression occurred in less than fifteen seconds. No interference by foam in polymerization, slurry, polymer filtration, or recovery of unreacted monomer was encountered.

As illustrated in the examples, the range of surface-active agent used is critical. If less than about 0.035% is present, the process cannot be operated smoothly. If more than about 0.080% is present, an unfilterable suspension results.

In addition to the preparation of acrylonitrile/vinylidene chloride copolymers, terpolymers of the aforementioned monomers and from about 0.1% to about 5.0% of an ethylenically unsaturated monomer may be prepared by the process of this invention. Preferably, the amount of acrylonitrile is at least about 75% with the amount of vinylidene chloride being present in an amount up to about 25%.

The third monomeric component may be selected from any of the ethylenically unsaturated compounds which are copolymerizable with acrylonitrile and vinylidene chloride, e.g., vinyl acetate, methyl vinyl ketone, methyl methacrylate, dimethyl itaconate, butyl methacrylate, diethyl maleate, vinyl trimethyl acetate, styrene, acrylyl chloride, vinyl pyridine, vinyl imidazol, chloroprene, vinyl oxyethyl formamide, methacrylamide, divinyl benzene, methylene bis-acrylamide, vinylidene cyanide, and salts of styrenesulfonic acid, to mention a few. Due to their enhanced dyeability, terpolymers of acrylonitrile, vinylidene chloride and a monomer containing a sulfonate group, particularly one of the salts of styrenesulfonic acid are preferred. Any of the sulfonate polymerizable monomers disclosed in the copending application of Anthes, U.S. application Serial No. 597,322, filed July 12, 1956, may be used.

In the initiator system, any inorganic redox initiation system may be utilized. I have found the system composed of a water-soluble derivative of a perdisulfuric acid such as potassium persulfate in combination with a water-soluble, oxidizable sulfoxy compound in which the valence of a sulfur atom does not exceed 4 such as sodium meta-bisulfite, sodium bisulfite, sodium hydrosulfite, sulfur dioxide, and other similar water-soluble salts to be particularly useful. The presence of trace amounts of iron, in the form of an ionizable iron salt, e.g., ferric chloride, ferric bromide, ferric nitrate, ferric sulfate, etc., in the polymerization reaction is desirable although not required. Generally, the water used in the process will contain a sufficient amount; however, an amount of the ferric salt from between 0.0001% and 0.05%, based on the total weight of the monomers used, may be added.

As the surface-active agent or emulsifier, which must be added in a concentration of about 0.035% to about 0.080%, which amount will stabilize the emulsion of liquid acrylonitrile and vinylidene chloride monomers in water but will not stabilize the suspension of the polymeric product of those monomers in water, I have found that water-soluble anionic, cationic, and nonionic surfactants may be used. Among the anionic agents are the alkali metal salts of the fatty alkyl sulfates, e.g., octyl sulfate, decyl sulfate, lauryl sulfate, myristyl sulfate, and oleyl sulfate; the alkyl aryl sulfonates, e.g., methyl naphthalene sulfonate, ethyl naphthalene sulfonate, isopropyl naphthalene sulfonate, diisopropyl naphthalene sulfonate, butyl naphthalene sulfonate, butyl diphenyl sulfonate, and the like. Suitable cationic surfactants include the fatty alkylol amine condensates, heterocyclic tertiary amines, and quaternary ammonium compounds. Among the nonionic surfactants are the ester- and ether-linked polyethenoxy compounds and the esters of the sugar alcohols, sorbitol and mannitol. The preparation of these and other nonionic surfactants is described in U.S. Patents Nos. 2,322,820 and 2,380,166.

One advantage of the process of this invention lies in the fact that copolymers of acrylonitrile and vinylidene chloride in very pure form are obtained at temperatures below the reflux temperature of the reactants. Another advantage lies in the fact that isolation of the substantially pure polymer from the polymerization reactants can be accomplished using standard filtration techniques.

The products obtained by my process may be readily converted into shaped objects and in particular to textile fibers and filaments by standard techniques. These products show particularly desirable flame resistant characteristics in addition to retaining the excellent processability and desirable aesthetic properties of acrylonitrile fibers. Additional desirable features, such as improved dyeability, may be incorporated in the fibers by the addition of a third monomeric component if desired.

It will be apparent that many widely different embodiments of this invention may be made without departing from the spirit and scope thereof, and therefore it is not intended to be limited except as indicated in the appended claims.

I claim:

1. The process which comprises copolymerizing a mixture of monomers containing at least 75% acrylonitrile and up to about 25% of vinylidene chloride at a temperature from about 30° C. to about 55° C. in the presence of water, a water-soluble surface-active agent selected from the group consisting of alkali metal salts of fatty alkyl sulfuric acids, alkali metal salts of alkyl aryl sulfonic acids, and polyoxyethylene sorbitan monooleate in an amount from about 0.035% to about 0.080% based on the total weight of acrylonitrile and vinylidene chloride, and an initiator system containing a persulfate catalyst and a sulfoxy reducing agent, the amount of water being adjusted to provide a concentration of monomers of from about 13% to about 30% based on the total weight of the reaction mixture.

2. The process of claim 1 wherein said catalyst is potassium persulfate.

3. The process of claim 1 wherein said reducing agent is sodium meta-bisulfite.

4. The process of claim 1 wherein said catalyst is present in an amount from about 0.01% to about 2.0% and said reducing agent is present in an amount from about 0.5% to about 5.0% based on the total weight of vinylidene chloride and acrylonitrile.

5. The process of claim 1 wherein from about 0.1% to about 5.0% of a copolymerizable ethylenically unsaturated monomer is present.

6. The process of claim 5 wherein said monomer is a salt of styrenesulfonic acid.

7. The process of preparing terpolymers from a mixture of monomers containing at least 75% acrylonitrile, up to about 20% vinylidene chloride and from about 0.1% to about 5.0% of a copolymerizable ethylenically unsaturated monomer which comprises continuously feeding acrylonitrile, vinylidene chloride, said copolymerizable monomer, and aqueous solutions containing from about 0.035% to about 0.080% of a water-soluble surface-active agent selected from the group consisting of alkali metal salts of fatty alkyl sulfuric acids, alkali metal salts of alkyl aryl sulfonic acids, and polyoxyethylene sorbitan monooleate, from about 0.5% to about 5.0% of a sulfoxy reducing agent and from about 0.01% to about 2.0% of a persulfate catalyst based on the total weight of acrylonitrile and vinylidene chloride, to a reaction vessel while maintaining said vessel at a temperature from about 30° C. to about 55° C. said monomers being present in a concentration from about 13% to about 30% based on the total weight of the reaction mixture.

8. The process of claim 7 wherein said monomer is sodium styrenesulfonate.

9. The process of claim 7 wherein said catalyst is potassium persulfate.

10. The process of claim 7 wherein said reducing agent is sodium meta-bisulfite.

References Cited in the file of this patent

UNITED STATES PATENTS

| | | |
|---|---|---|
| 2,462,354 | Brubaker | Feb. 22, 1949 |
| 2,486,241 | Arnold | Oct. 25, 1949 |
| 2,606,894 | Pitzi | Aug. 12, 1952 |
| 2,624,724 | Park | Jan. 6, 1953 |
| 2,843,572 | Wooten et al. | July 15, 1958 |

FOREIGN PATENTS

| | | |
|---|---|---|
| 698,443 | Great Britain | Oct. 14, 1953 |